United States Patent
Sheppard et al.

(10) Patent No.: US 6,976,362 B2
(45) Date of Patent: Dec. 20, 2005

(54) INTEGRATED FISCHER-TROPSCH AND POWER PRODUCTION PLANT WITH LOW $CO_2$ EMISSIONS

(75) Inventors: Richard O. Sheppard, Evergreen, CO (US); Dennis L. Yakobson, Arvada, CO (US)

(73) Assignee: Rentech, Inc., Denver, CO (US)

( * ) Notice: Subject to any disclaimer, the term of this patent is extended or adjusted under 35 U.S.C. 154(b) by 0 days.

(21) Appl. No.: 10/612,573

(22) Filed: Jul. 1, 2003

(65) Prior Publication Data

US 2004/0216465 A1 Nov. 4, 2004

Related U.S. Application Data

(63) Continuation-in-part of application No. 09/963,349, filed on Sep. 25, 2001, now Pat. No. 6,632,846.

(51) Int. Cl.[7] ................................................ F02C 3/22
(52) U.S. Cl. .......................... 60/780; 60/781; 60/39.12; 60/39.464
(58) Field of Search ....................... 60/780, 781, 39.12, 60/39.182, 39.464

(56) References Cited

U.S. PATENT DOCUMENTS

| | | | |
|---|---|---|---|
| 3,617,498 A | | 11/1971 | Kittrell |
| 3,972,958 A | | 8/1976 | Garwood et al. |
| 3,986,349 A | | 10/1976 | Egan |
| 4,059,648 A | | 11/1977 | Derr et al. |
| 4,092,825 A | | 6/1978 | Egan |
| 4,197,184 A | | 4/1980 | Munro et al. |
| 4,202,167 A | * | 5/1980 | Suggitt et al. .............. 60/39.12 |
| 4,256,654 A | | 3/1981 | Schlinger et al. |
| 4,308,128 A | * | 12/1981 | Cummings .................. 208/86 |
| 4,404,088 A | | 9/1983 | Bachtel et al. |
| 4,433,065 A | | 2/1984 | van der Burgt et al. |
| 4,496,371 A | | 1/1985 | Urban et al. |
| 4,501,655 A | | 2/1985 | Hilfman et al. |
| 4,524,581 A | * | 6/1985 | Cascone et al. .............. 60/781 |
| 4,549,396 A | | 10/1985 | Garwood et al. |
| 4,579,985 A | | 4/1986 | Minderhoud et al. |
| 4,595,702 A | | 6/1986 | Chu et al. |
| 4,605,639 A | | 8/1986 | Dyer et al. |
| 4,617,288 A | | 10/1986 | Bell et al. |
| 4,902,303 A | | 2/1990 | Den Bleyker |
| 4,957,715 A | | 9/1990 | Grover et al. |
| 4,992,081 A | | 2/1991 | Den Bleyker |
| 4,994,428 A | | 2/1991 | Bell et al. |
| 5,023,276 A | | 6/1991 | Yarrington et al. |

(Continued)

OTHER PUBLICATIONS

A.R. Jones, The Commercial Combustion of Orimulsion, 1997, pp.: 318–339.

Mark S. Bohn and Charles B. Benham, A Comparative Study of Alternate Flowsheets Using Orimulsion as Feedstock, Oct. 1999 (The 25th International Technical Conference on Coal Utilization & Fuel Systems), pp.: 1–10.

(Continued)

*Primary Examiner*—Ted Kim
(74) *Attorney, Agent, or Firm*—Aileen Law; Patent Law Offices of Rick Martin, P.C.

(57) ABSTRACT

A plant for producing Fischer-Tropsch liquids and electrical power with greatly reduced emissions of carbon dioxide to the atmosphere is made up of a syngas generator unit, an air separation unit, a Fischer-Tropsch unit, a $CO_2$ removal unit, and a combined cycle electricity generation unit. Each of Fischer-Tropsch liquids, carbon dioxide, and electrical power can be recoverable under proper economic conditions. Electrical power is recoverable by the use of a gas turbine fueled by predominantly hydrogen and a steam turbine powered by steam generated by cooling exhaust gases from the gas turbine. Sequestration of $CO_2$ and fueling the gas turbine with hydrogen reduces the amount of greenhouse gases emitted to the atmosphere.

24 Claims, 1 Drawing Sheet

U.S. PATENT DOCUMENTS

| | | | |
|---|---|---|---|
| 5,026,472 A | | 6/1991 | Hoehn et al. |
| 5,255,504 A | * | 10/1993 | Hodrien et al. ............... 60/781 |
| 5,289,676 A | * | 3/1994 | Brown et al. .................. 60/781 |
| 5,324,335 A | | 6/1994 | Benham et al. |
| 5,324,336 A | | 6/1994 | Child |
| 5,403,568 A | | 4/1995 | Stowe, Jr. |
| 5,424,051 A | | 6/1995 | Nagji et al. |
| 5,500,449 A | | 3/1996 | Benham et al. |
| 5,504,118 A | | 4/1996 | Benham et al. |
| 5,506,272 A | | 4/1996 | Benham et al. |
| 5,543,437 A | | 8/1996 | Benham et al. |
| 5,545,238 A | | 8/1996 | Brooker et al. |
| 5,611,947 A | | 3/1997 | Vavruska |
| 5,620,670 A | | 4/1997 | Benham et al. |
| 5,621,155 A | | 4/1997 | Benham et al. |
| 5,645,613 A | | 7/1997 | Benham et al. |
| 5,666,800 A | | 9/1997 | Sorensen et al. |
| 5,736,116 A | | 4/1998 | LeBlanc et al. |
| 5,763,716 A | | 6/1998 | Benham et al. |
| 5,993,761 A | | 11/1999 | Czernichowski et al. |
| 6,153,852 A | | 11/2000 | Blutke et al. |
| 6,156,809 A | | 12/2000 | Clark et al. |
| 6,248,794 B1 | | 6/2001 | Gieskes |
| 6,306,917 B1 | | 10/2001 | Bohn et al. |
| 6,632,846 B2 | * | 10/2003 | Sheppard et al. ........... 518/715 |

OTHER PUBLICATIONS

Herbert Kolbel and Milos Ralek, The Fischer–Tropsch Synthesis in the Liquid Phase, 1980 (Marcel Dekker, Inc.), pp.: 225–275.

Nicholas P. Chopey et al., Technology to Cool Down Global Warming, Jan. 1999 (Chemical Engineering), pp.: 37, 39, 41.

Charles B. Benham and Mark S. Bohn, Maximization of Diesel Fuel Production from an Iron–Based Fischer–Tropsch Catalyst, Dec. 1998 (1999 AIChE Spring National Meeting), pp.: 1–5.

Franzo Marruffo et al., Orimulsion and alternative source of energy, Mar. 8–11, 1999, The Proceedings of the 24th International Technical Conference on Coal Utilization and Fuel Systems, pp.: 13–24.

David Gray and Glen Tomlinson, A Novel Configuration for Coproducing Fischer–Tropsch Fuels and Electric Power from Coal and Natural Gas, Sep. 1997, pp.: 1–6.

Joe Verghese, State of the Art in GTL Technology, Dec. 1998, pp.: whole article.

Dennis L. Yakobson, Monetizing Standard Gas Reserves '98, Dec. 1998, pp.: whole article.

Klaus S. Lackner, Patrick Grimes, and Hans–Joachim Ziock, Carbon Dioxide Extraction from Air: Is it an Option?, Mar. 8–11, 1999, The Proceedings of the 24th International Technical Conference on Coal Utilization and Fuel Systems, pp.: 885–887, 895, 903–904.

Charles B. Benham and Dennis L. Yakobson, Optimization of Conversion of Low Hydrogen Containing Feedstocks using Rentech's Gas–to–Liquids (GTL) Technology, Jul. 1998, pp.: 1–19.

M.D. Schlesinger, J.H. Crowell, Max Leva and H.H. Storch, Fischer–Tropsch Synthesis in Slurry Phase, Jun. 1951, pp.: 1474–1479.

Sean I. Plasynski, Arun C. Bose, Perry D. Bergman, Tom P. Dorchak, David M. Hyman, H.P. Loh, Harvey M. Ness, Carbon Mitigation: A Holistic Approach to the Issue, Mar. 8–11, 1999, The Proceedings of the 24th International Technical Conference on Coal Utilization and Fuel Systems, pp.: 897–908.

Arthur W. Tower III, Fischer–Tropsch Technology, Gas-to–Liquids, Solids–to–Liquids, Liquids–to–Liquids, Dec. 1998, pp.: whole book, pp. 1–54.

Alberto Rivalta and Charles E. Carraher, Jr., Orimulsion–A New Fuel for Power Generation and Future Feedstock Use, 1996 (Polymer News vol. 21, No. 10), pp.: 342–344.

* cited by examiner

INTEGRATED FISCHER-TROPSCH AND POWER PRODUCTION PLANT WITH LOW $CO_2$ EMISSIONS

CROSS REFERENCE TO RELATED APPLICATION

This is a continuation-in-part of U.S. Patent Application Ser. No. 09/963,349 filed Sep. 25, 2001, titled "Integrated UREA Manufacturing Plants and Processes" which issued as U.S. Pat. No. 6,632,846 on Oct. 14, 2003.

FIELD OF THE INVENTION

Syngas generators, such as reformers and gasifiers of hydrocarbon fluids and solid carbonaceous materials, and Fischer Tropsch (FT) units, primarily for creating liquid hydrocarbons from syngas, are combined to create an integrated plant for providing one or more of urea, ammonia, carbon dioxide, electric power, and even sulfur when dealing with sulfur-containing raw material.

BACKGROUND OF THE INVENTION

Our modern civilization cannot be sustained without burning carbonaceous materials for primarily motive and electrical power within the foreseeable future. The carbon dioxide ($CO_2$) generated by such burning may be contributing to the gradual increase of the planet's temperature since 1900. This is occurring because $CO_2$ permits the sun's energy to pass through the atmosphere but traps the longer wavelength energy radiated by the earth into the atmosphere.

The integrated plants and processes of this invention can help reduce the amount of $CO_2$ currently vented into the air as a by-product of synthesizing the various products later discussed in the description of the manufacturing plant flow diagrams. Consequently, the reduction of $CO_2$, which is a greenhouse gas, through the sequestration processes detailed herein, reduces the amount of greenhouse gases vented into the atmosphere. Further, the plants of this invention produce substantial energy savings by balancing exothermic and endothermic reactors as discussed below.

A variety of syngas generators are known, e.g., reformers, autothermal reactors, and gasifiers. Thus, U.S. Pat. No. 5,611,947 to J. S. Vavruska, U.S. Pat. No. 5,993,761 to Piotr and Albin Czernichowski and U.S. Pat. No. 6,153,852 to A. F. Blutke et al. all teach plasma reformers useful in constructing the integrated facilities used in the process of this invention. Likewise, Charles B. Benham et al., U.S. Pat. No. 5,621,155, utilize reformers to provide feedstreams to Fischer Tropsch reactors utilizing iron-based catalysts. U.S. Pat. No. 6,306,917 to Mark S. Bohn et al. teaches that hydrocarbons, carbon dioxide, and electric power can be manufactured at a plant using the Fischer-Tropsch (FT) reactors. It also suggests that urea can be produced from the carbon dioxide but no suggestion is given as to what facilities or processes are needed to manufacture the urea or the economic practicality of such a course.

The mentioned references deal with economic niches where tax incentives, regulatory penalties and other incentives must combine with other factors to make the processes commercial. A continuing increase in world temperatures or a firmer tie-in between the $CO_2$ in the atmosphere and increasing world climate temperatures could quickly result in such incentives. The plants can be of particular utility when sited at remote locations where there is a large surplus of natural gas, petroleum, coal or other carbonaceous materials which are presently unrecoverable because of transportation costs, etc.

Increasing regulatory demands have limited, and, in some instances extinguished, the petroleum producers' and refiners' ability to flare waste gases. Further, there are often limitations on the amounts and kinds of other wastes that can be disposed of locally without harm to the environment, e.g., at an offshore crude oil producing platform. The multiproduct plants of this invention provide a mechanism for packaging the various unit processes required for the utilization of this invention in a manner that the resulting plants can be utilized to supply electricity for a platform, eliminate the need for flares, convert the waste gases and liquids normally flared into liquid hydrocarbons, ammonia and/or urea while substantially eliminating local $CO_2$ emissions. Solid commercial products can also be produced for agriculture, e.g., sulfur and urea prills. Such self-contained plants provide trade-offs; for offshore petroleum and/or natural gas platforms, which can improve their economic life span. This is particularly true where the deposits being recovered are sour or include some $CO_2$ production.

The unit processes of this invention are each individually well known and the economics of the processes have been commercially proven. However, the joining of these unit processes as taught herein provides a utility for environmental and other purposes that has heretofore been unforeseen.

SUMMARY OF THE INVENTION

Ammonia, carbon dioxide, hydrocarbons, electric power and urea are producible from the reaction of hydrogen, nitrogen, water, and a source of oxygenated carbon. The process begins with oxygen, water and coal being formed into syngas ($H_2$/CO) in a syngas generator. The syngas is utilized in a FT reactor to produce hydrocarbons and hydrogen by general the reaction:

$$3H_2 + CO \rightarrow CH_4 + H_2 \quad (1).$$

The hydrogen from this reaction is reacted with nitrogen from an air separation oxygen plant to form ammonia, $NH_3$:

$$3H_2 + N_2 \rightarrow 2NH_3 \quad (2).$$

The ammonia can then be reacted with carbon dioxide, $CO_2$, to make urea, $H_2NCONH_2$, (reaction 3). The $CO_2$ for this reaction is formed by the well known water-gas shift reaction (4).

$$2NH_3 + CO_2 \rightarrow H_2NCONH_2 + H_2O \quad (3).$$

$$CO + H_2O \rightarrow CO_2 + H_2 \quad (4).$$

Electric power can be produced by combustion of hydrogen, formed in reactions 1 and 4, in a gas turbine used to drive an electricity generator and/or utilizing steam produced from syngas heat recovery to drive a steam turbine which, in turn, drives an electricity generator. Furthermore, electric power can be produced without producing urea. Sulfur and various heavy metals can be recovered when sulfur or metal-containing carbon sources are utilized.

BRIEF DESCRIPTION OF THE FIGURE

FIG. 1 depicts a syngas producing unit and a FT unit combined to provide liquid hydrocarbons and electric power with low $CO_2$ emissions.

DETAILED DESCRIPTION OF THE DRAWING

Figure 1:
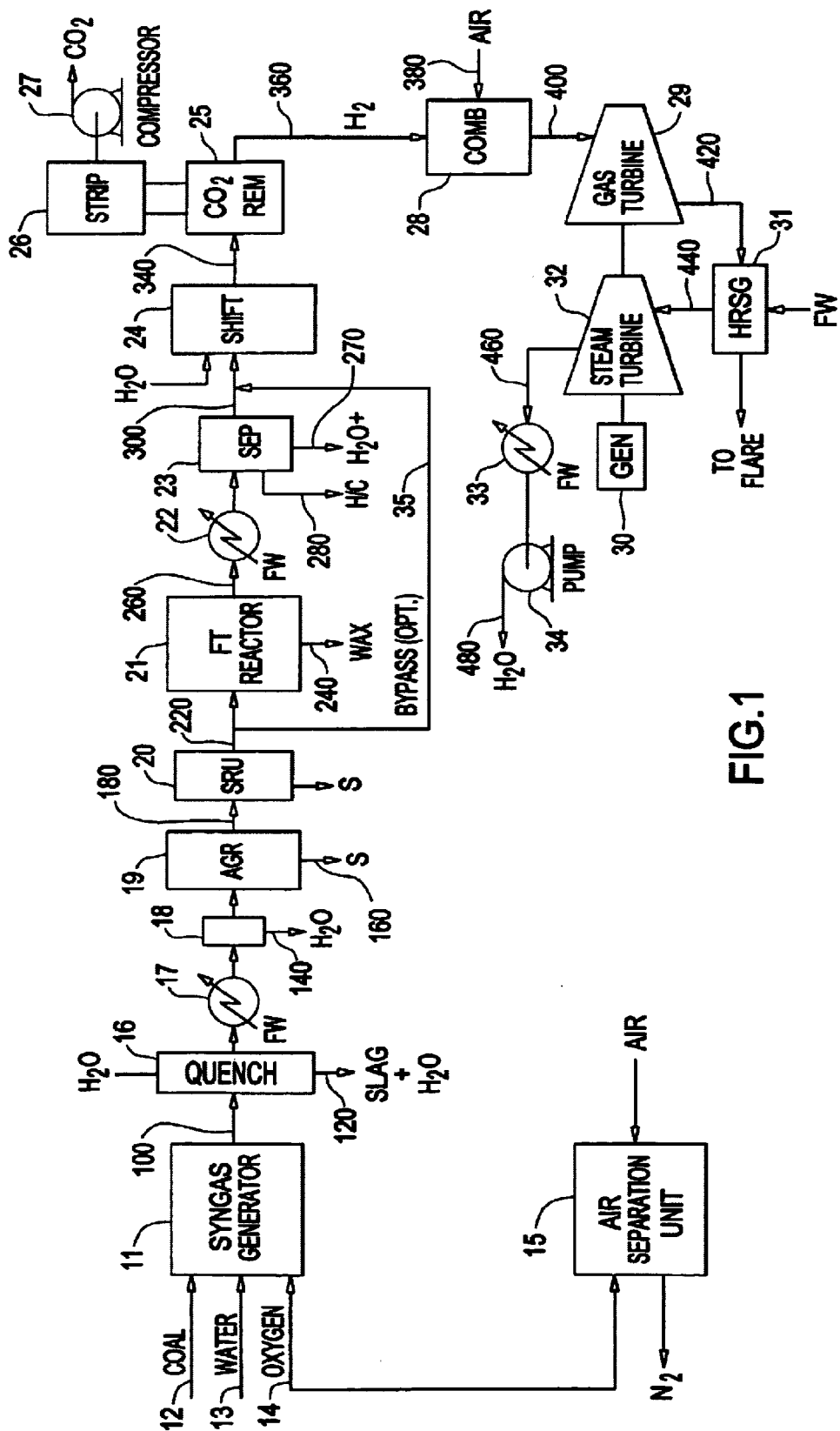
FIG. 1 illustrates the ease of interaction which can be obtained through a combination of several well known unit processes for manufacturing a variety of materials, all of which can be provided in quantities sufficient for commercial sales if suitable raw materials are available.

In the coal gasification/FT/power plant of FIG. 1, crushed coal, water ($H_2O$), and oxygen ($O_2$) are introduced into the syngas generator 11 through piping 12, 13 and 14, respectively. The oxygen is preferably from a cryogenic air separation unit 15. However, a pressure swing absorption unit can also be utilized. Either can provide nitrogen ($N_2$) for an ammonia ($NH_3$) plant (not shown). Gasification takes place at temperatures of 2400° F. to 2700° F. and the syngas 100 is generally cooled to about 1000° F. by direct water injection in quench unit 16 to remove slag and other minerals 120. The syngas 100 is further cooled in a waste heat boiler 17 wherein water in the syngas is condensed and feed water FW is boiled to produce medium pressure saturated steam for process use (not shown). The condensed water 140 is removed in separator vessel 18 and the syngas 100 is piped to the acid gas removal unit (AGR) 19 to remove bulk sulfur 160 from the syngas generator 11 output 100. The partially desulfurized resulting gas 180 is then passed through sulfur removal unit (SRU) 20 to remove trace quantities of sulfur. Preferably, the SRU 20 uses a zinc oxide-based catalyst and is run at temperatures of 600° F. to 725° F. with a linear velocity of 4–10 ft/sec.

To the extent needed, the gaseous treated stream, or desulfurized syngas, 220, from the SRU 20 is then piped to the FT reactor 21. Wax 240 is removed from the FT reactor 21 as a liquid for use as a product or for production of diesel fuel in a hydrocracking unit (not shown). The overhead gases 260 from FT reactor 21 are cooled in heat exchanger 22 whereby condensing water 270 and hydrocarbons 280 are removed in separator vessel 23. Tail gas 300 from the product separator 23 is piped to a water gas shift reactor 24. Steam 320 is added to the shift reactor 24 to react with the carbon monoxide in the tail gas 300 to produce hydrogen and carbon dioxide, 340. The shift reactor 24 preferably uses a high temperature iron/chrome shift catalyst. The output 340 of the shift reactor 24 is passed through $CO_2$ removal unit 25 which removes $CO_2$ preferably in an amine solution. The $CO_2$ is removed from the solution in $CO_2$ stripper 26 and compressed in compressor 27 for sequestration or use. Combustible components 360 from the $CO_2$ removal unit 25, comprised primarily of hydrogen, are fed to a combustor 28 and burned with air 380 to produce combustion products 400 comprised primarily of water vapor and nitrogen. The combustion products 400 are fed to the gas turbine 29 which is used to drive a coupled electricity generator 30 for power generation. The hot exhaust gases 420 from gas turbine 29 are cooled in a heat recovery steam generator (HRSG) 31 and burned in a flare (not shown). The HRSG unit 31 generates high pressure superheated steam 440 which powers steam turbine 32 also coupled to electricity generator 30. Exhaust steam 460 from steam turbine 32 is condensed in water-cooled condenser 33, and the water 480 is recycled (not shown) using pump 34. Fueling the gas turbine 29 with primarily hydrogen greatly reduces the amount of $CO_2$ produced in the stack gases.

In one embodiment of the invention, the syngas 220 leaving sulfur removal unit 20 is divided into two streams. One gas stream goes to the FT unit 21 while the other stream 35 bypasses the FT and hydrocarbon recovery units 21, 22, and 23 and combines with the FT tail gases 300 fed to the shift reactor 24. Using this embodiment, plant output can be adjusted to optimize the split between FT products and electrical power production.

EXAMPLES

Example 1

Coal Gasification to FT Liquids, Electrical Power and $CO_2$

Example 1 is a computer simulation based on the flow sheet of FIG. 1.

5500 tpd Pittsburgh #8 coal is gasified with 3091 tpd water and 4806 tpd oxygen. The coal is 74.16% by weight carbon. After quenching and cleaning, 47.2% of the syngas is sent to a FT reactor using an iron-based catalyst to produce 6000 barrels per day of $C_5+$ hydrocarbon products and tail gases. After separating the FT hydrocarbon products from the FT tail gases, the tail gases and the other 52.8% of the syngas are mixed with 233 MMSCFD of steam and sent to a low-temperature shift reactor. The gases leaving the shift reactor having achieved equilibrium conditions at 250° C. are comprised on a volume basis of approximately 38.0% $H_2$, 37.5% $CO_2$, 23.0% $H_2O$, and less than 1% of CO, $CH_4$ and $N_2$. After removing 11,300 tpd of $CO_2$ for sequestration and condensing the water from the tail gases, the remaining stream of predominantly H2 is used as fuel in the combustion turbine to produce approximately 349 Mwe of power from a combined cycle unit. Only 3.5% by weight of the carbon in the coal fed to the gasifier is present in the combustion turbine flue gases emitted into the atmosphere and contributing the greenhouse effect.

The flow sheet takes advantage of the water-gas shift activity of an iron-based FT catalyst in converting much of the carbon in the feed coal to $CO_2$. This catalyst is discussed in U.S. Pat. No. 5,504,118 issued to Charles B. Benham et al. A computer simulation utilizing the equipment of this flow sheet of 5500 ton per day of coal produces 6000 barrels per day of FT liquids, 400 MW net electrical power, and 10515 ton per day of sequesterable $CO_2$. Only 9% of the feed carbon is in the stack gas.

Simulation of the coal gasifier was based on synthesis gas composition given in "Table 1. Syngas Production from Various Carbonaceous Feedstocks", Texaco Gasification Process for Solid Feedstocks, Texaco Development Corporation, 1993. Simulation of the Fischer-Tropsch reactor was based on Rentech's iron-based catalyst (U.S. Pat. No. 5,504,118).

General Teaching of the Invention

The obvious benefits of utilizing the unit operations and processes of this invention include:

With respect to FIG. 1, there is an unexpected benefit from shifting the use of the coal gasifier operation to convert the usually desired CO to $CO_2$ production. It enables the heat values of the syngas to simultaneously produce electrical power and sequester $CO_2$. The use of iron-based FT catalysts to form $CO_2$ from CO allows some of the feed carbon to be sequestered as $CO_2$. When the sequestered $CO_2$ is reacted with ammonia produced from hydrogen recovered from the syngas production and the FT tail gas and nitrogen from the air separation unit, a synergistic benefit is obtained via the production of urea. Further, when $CO_2$ from a reformed natural gas feed, $H_2$ obtained from the FT tail gas and the nitrogen obtained from the air separation unit are reacted as shown, urea can be produced rather than having to vent the $CO_2$ to the atmosphere.

Feedstocks include coal and low value industrial materials, e.g., petroleum coke and refinery bottoms having a hydrogen to carbon ratio of about 1. Feedstocks can, however, have higher ratios, e.g., natural gas with a ratio approaching 4:1. Many of these materials will include contaminants which must be removed, e.g., sulfur, arsenic and silicaceous materials which are removed during the course of the syngas manufacturing steps as slag or sulfur compounds.

The syngas produced can be contaminated with unwanted impurities such as chlorine and other toxic materials which must be safely removed and stored.

For the purposes of this invention, iron-based FT catalysts are preferred because they produce $CO_2$ and $H_2$ via their water gas shift activity. In general, the reactors, materials of construction and processes are well known to those skilled in the refining and Fischer Tropsch utilizing industries. The assemblage of the reactors taught form the basis of the claimed chemical processing units sequenced in the invention. The sequenced chemical processes, catalysts, temperatures, concentrations and other stated parameters form the basis of the chemical process claims. It is to be understood that the order of the chemical processing units and the process steps and conditions described in Figures and the discussion thereof can be varied and the variations are intended to fall within the claims as taught in the description and Figures.

We claim:

1. A process comprising:
   introducing a carbonaceous raw material, water and oxygen into a syngas generator under syngas forming operating conditions to form a syngas;
   introducing a portion of the syngas into a Fischer-Tropsch reactor and forming primarily aliphatic hydrocarbons and carbon dioxide;
   separating liquid hydrocarbons from the carbon dioxide, unconverted carbon monoxide, and hydrogen, which are Fischer-Tropsch tail gases;
   introducing a portion of the syngas along with water and the Fischer-Tropsch tail gases into a water-gas-shift reactor to produce primarily hydrogen and carbon dioxide;
   scrubbing the carbon dioxide from gases emitted from the shift reactor using a $CO_2$ scrubber;
   collecting the carbon dioxide for sale or sequestration; and
   burning the gases rich in hydrogen from the $CO_2$ scrubber in a gas turbine combustor of a combined cycle plant to drive a generator mechanically coupled to the gas turbine during a production of electricity.

2. The process of claim 1, wherein said syngas forming operating conditions comprise a syngas generator temperature operating from about 2400° F. to about 2700° F.

3. The process of claim 1 further comprising desulfurizing the syngas before it enters the Fischer-Tropsch reactor.

4. The process of claim 1, wherein the gas turbine produces a stack gas having a low $CO_2$ content.

5. The process of claim 1 further comprising a catalyst of unsupported precipitated iron to be used in the Fischer-Tropsch reactor.

6. The process of claim 5, wherein the Fischer-Tropsch catalyst is doped with potassium and copper.

7. The process of claim 6, wherein the weight ratio of potassium to iron in the catalyst is between about 0.007 and about 0.010.

8. The process of claim 6, wherein the weight ratio of copper to iron in the catalyst is between about 0.005 and about 0.015.

9. A process comprising:
   separating oxygen from nitrogen from the air in an air separation unit;
   introducing a carbonaceous raw material, water and oxygen from the air separation unit into a syngas generator under syngas forming operating conditions to form syngas;
   introducing a portion of the syngas into a Fischer-Tropsch reactor and forming primarily aliphatic hydrocarbons and carbon dioxide;
   separating liquid hydrocarbons from the carbon dioxide, unconverted carbon monoxide, and hydrogen of Fischer-Tropsch tail gases;
   introducing a portion of the syngas along with water and the Fischer-Tropsch tail gases into a water-gas-shift reactor to produce primarily hydrogen and carbon dioxide;
   scrubbing the carbon dioxide from effluent from the shift reactor using a $CO_2$ scrubber;
   collecting the carbon dioxide for sale or sequestration; and
   burning the gases rich in hydrogen from the $CO_2$ scrubber in a gas turbine combustor of a combined cycle plant to drive a generator mechanically coupled to the gas turbine during a production of electricity.

10. The process of claim 9, wherein said syngas forming operating conditions comprise a syngas generator temperature operating from about 2400° F. to about 2700° F.

11. The process of claim 9 further comprising desulfurizing the syngas before it enters the Fischer-Tropsch reactor.

12. The process of claim 9, wherein the gas turbine produces a stack gas having a low $CO_2$ content.

13. The process of claim 9 further comprising a catalyst of unsupported precipitated iron to be used in the Fischer-Tropsch reactor.

14. The process of claim 13, wherein the Fischer-Tropsch catalyst is doped with potassium and copper.

15. The process of claim 14, wherein the weight ratio of potassium to iron in the catalyst is between about 0.007 and about 0.010.

16. The process of claim 14, wherein the weight ratio of potassium to iron in the catalyst is between about 0.005 and about 0.015.

17. A process comprising:
   separating oxygen from nitrogen from the air in an air separation unit;
   introducing a carbonaceous raw material, water and oxygen from the air separation unit into a syngas generator under syngas forming operating conditions to form syngas;
   introducing a portion of the syngas into a Fischer-Tropsch reactor having an iron-based catalyst, and forming primarily aliphatic hydrocarbons and carbon dioxide;
   separating liquid hydrocarbons from the carbon dioxide, unconverted carbon monoxide, and hydrogen, which are Fischer-Tropsch tail gases;
   introducing a portion of the syngas along with water and the Fischer-Tropsch tail gases into a water-gas-shift reactor to produce primarily hydrogen and carbon dioxide;
   scrubbing the carbon dioxide from gases emitted from the shift reactor using a $CO_2$ scrubber;
   collecting the carbon dioxide for sale or sequestration; and
   burning the gases rich in hydrogen from the $CO_2$ scrubber in a gas turbine combustor of a combined cycle plant to drive a generator mechanically coupled to the gas turbine during a production of electricity.

18. The process of claim 17, wherein said syngas forming operating conditions comprise a syngas generator temperature operating from about 2400° F. to about 2700° F.

19. The process of claim 17 further comprising desulfurizing the syngas before it enters the Fischer-Tropsch reactor.

20. The process of claim 17, wherein the gas turbine produces a stack gas having a low $CO_2$ content.

21. The process of claim 17, wherein the catalyst to be used in the Fischer-Tropsch reactor is unsupported precipitated iron.

22. The process of claim 21, wherein the Fischer-Tropsch catalyst is doped with potassium and copper.

23. The process of claim 22, wherein the weight ratio of potassium to iron in the catalyst is between about 0.007 and about 0.010.

24. The process of claim 22, wherein the weight ratio of copper to iron in the catalyst is between about 0.005 and about 0.015.

* * * * *